US008631249B2

(12) United States Patent
Koike

(10) Patent No.: US 8,631,249 B2
(45) Date of Patent: Jan. 14, 2014

(54) OPERATION UNIT AND PROGRAM

(75) Inventor: Masanobu Koike, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 13/227,648

(22) Filed: Sep. 8, 2011

(65) Prior Publication Data

US 2012/0047417 A1    Feb. 23, 2012

Related U.S. Application Data

(63) Continuation of application No. PCT/JP2010/052904, filed on Feb. 24, 2010.

(30) Foreign Application Priority Data

Mar. 10, 2009 (JP) ................. 2009-056873

(51) Int. Cl.
*G06F 21/00* (2013.01)
(52) U.S. Cl.
USPC .......................................... 713/190; 713/194
(58) Field of Classification Search
None
See application file for complete search history.

(56) References Cited

U.S. PATENT DOCUMENTS

| 6,940,975 B1 | 9/2005 | Kawamura et al. |
| 2003/0048903 A1 | 3/2003 | Ito et al. |
| 2005/0184760 A1 | 8/2005 | Trichina et al. |

FOREIGN PATENT DOCUMENTS

| JP | 2000-66585 A | 3/2000 |
| JP | 2002-366029 A | 12/2002 |
| JP | 2005-236977 A | 9/2005 |
| JP | 2008-233683 A | 10/2008 |

OTHER PUBLICATIONS

Thomas S. Messerges, "Securing the AES Finalists Against Power Analysis Attacks," 7th International Workshop, FSE 2000 proceedings, Apr. 2000, pp. 150-164.
International Search Report mailed on Apr. 6, 2010 in corresponding international patent application No. PCT/JP2010/052904.
Louis Goubin, Jacques Patarin, "DES and Differential Power Analysis the "Duplication" Method," CHES '99, LNCS 1717, pp. 158-172 (1999).
Louis Goubin, "A Sound Method for Switching between Boolean and Arithmetic Masking," CHES 2001, LNCS 2162, pp. 3-15 (2001).
Jean-Sebastien Coron, Alexei Tchulkine, "A New Algorithm for Switching from Arithmetic to Boolean Masking," CHES 2003, LNCS 2779, pp. 89-97 (2003).
Background Art Information Sheet (1 page).
English translation of International Preliminary Report on Patentability No. PCT/JP2010/052904 dated Oct. 27, 2011.

*Primary Examiner* — Gilberto Barron, Jr.
*Assistant Examiner* — Malcolm Cribbs
(74) *Attorney, Agent, or Firm* — Posz Law Group, PLC

(57) ABSTRACT

In an embodiment, regarding an addition of a kb-bit number A and a b-bit random number r, element data of a pre-calculated table C' is set based on a sum $A_H + r_H$ of a value $A_H$ of upper b/2 bits of a number $A_2$, which is lower b bits of the number A, and a value $r_H$ of upper b/2 bits of the random number r and the sum $A_L + r_L$ of a value $A_L$ of lower b/2 bits of the number $A_2$ and a value $r_L$ of lower b/2 bits of the random number r in such a way that presence/absence of carrying-over of $A_2 + r$ is indicated. Accordingly, the size of the pre-calculated table needed to be reduced for obtaining an addition result of upper (k–1)b bits by mutually adding the kb-bit number A and the b-bit number r.

4 Claims, 8 Drawing Sheets

When b=8, r=0x19, and γ=0x56

| y= | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 10 | 10 | 10 | 10 | 10 | 10 | 10 | 10 | 10 | 10 | 10 | 10 | 10 | 10 | 20 | 30 |
| 1 | 56 | 56 | 56 | 56 | 56 | 56 | 56 | 56 | 56 | 56 | 56 | 56 | 56 | 56 | 56 | 56 |
| 2 | 56 | 56 | 56 | 56 | 56 | 56 | 56 | 57 | 57 | 57 | 57 | 57 | 57 | 57 | 57 | 57 |
| 3 | 57 | 57 | 57 | 57 | 57 | 57 | 57 | 57 | 57 | 57 | 57 | 57 | 57 | 57 | 57 | 57 |

Pre-calculated table

When b=4 and r=3

| y= | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 0 | 7 | 6 | 5 | 4 | B | A | 9 | 8 | F | E | D | C | 3 | 2 | 1 |

Pre-calculated table

G         G[9]

OPERATION UNIT AND PROGRAM

CROSS REFERENCE TO RELATED APPLICATIONS

This application is a Continuation Application of PCT Application No. PCT/JP2010/052904, filed Feb. 24, 2010 and based upon and claiming the benefit of priority from prior Japanese Patent Application No. 2009-056873, filed Mar. 10, 2009, the entire contents of all of which are incorporated herein by reference.

BACKGROUND OF THE INVENTION

1. Field of the Invention

The present invention relates to an operation unit and a program capable of reducing the size of a pre-calculated table needed when arithmetically masked data that is masked arithmetically is converted into logically masked data that is logically masked to have resistance to, for example, side channel analyses.

2. Description of the Related Art

Cryptography has become an indispensable technology for information communication technology in recent years. Such cryptography includes, for example, SSL (Secured Socket Layer), which is cryptography for communication, and an electronic signature capable of detecting whether a message is falsified. These technologies support a society that is becoming increasingly electronic as part of PKI (Public Key Infrastructure).

However, techniques for attacking cryptography are also becoming more sophisticated. Among others, a side channel analysis that measures the processing time or power consumption of an encryption processor to analyze secret information inside the encryption processor from measurement results increasingly poses an actual threat. The timing analysis and power analysis are known as typical side channel analyses.

As an example of the power analysis, the method of analyzing DES (Data Encryption Standard) will be described using drawings. This method is described in L. Goubin, J. Patarin, "DES and Differential Power Analysis—The Duplication Method", CHES' 99, LNCS 1717, pp. 158-172, 1999.

FIG. 7 is a schematic diagram of a data conversion unit in the final 16-th stage in a DES cryptographic device.

When two pieces of 32-bit input data $L_{15}$, $R_{15}$ and 48-bit key data $K_{16}$ are input into the 16-th data conversion unit, data conversion processing is performed and then, two pieces of 32-bit output data $L_{16}$, $R_{16}$ are output.

A result of bit transposition $IP^{-1}$ of the output data $L_{16}$, $R_{16}$ becomes cipher text output from the DES cryptographic device. The cipher text and the bit transposition are each known to potential attackers and thus, the output data $L_{16}$, $R_{16}$ are also known to potential attackers.

The 16-th data conversion unit extends the 32-bit input data $R_{15}$ to 48-bit data by E transposition. The extended data is used for XOR with the 48-bit key data $K_{16}$. The 48-bit data obtained after the XOR is divided into eight pieces of 6-bit divided data and each piece of the divided data is input into S-boxes $S_1, S_2, \ldots, S_8$.

Six-bit data is input into each S-box and 4-bit data is output therefrom and so that 32-bit output data is obtained in all. The 32-bit output data is converted into other 32-bit data by the P transposition and then an XOR thereof with the input data $L_{15}$ is calculated to yield one piece of the output data $L_{16}$. The other piece of the output data $R_{16}$ is the direct output of the input data $R_{15}$.

In such data conversion processing, data unknown to potential attackers is only the 48-bit key data $K_{16}$. Potential attackers determine the 48-bit value by analyzing the power consumption of the DES cryptographic device performing the 16-th data conversion processing.

More specifically, potential attackers collect power consumption waveforms $v_i(t)$ in DES processing of 1000 samples. t denotes discrete values of time and i denotes the sample number ($0 \leq i \leq 999$).

One bit of output of some S-box s in the 16-th stage is defined as a target bit. Six-bit input data c of the S-box s can be derived by retracing the output data $L_{16}$. The input data c of the S-box s includes, in addition to the input data c, a 6-bit partial key $k_j$ to be XORed with the input data c. The S-box output one bit to be the target is written as $s_i(k_j, c_i)$ with the partial key $k_j$ set as an unknown variable.

Based on the collected power consumption waveform, a differential average trace $T_j(t)$ is calculated by the formula below:

$$T_j(t) = \sum_{i=0}^{999} \left( s_i(k_j, c_i) - \frac{1}{2} \right) v_i(t) \quad \text{[Math 1]}$$

If the differential average trace $T_j(t)$ is calculated for all cases of 64 combinations as the 6-bit partial key $k_j$, one partial key $k_j$ of 64 combinations matches the partial key $k_j$ actually used and the differential average trace $T_j(t)$ in that case indicates the deviation of value. For partial keys of other 63 combinations, the partial average trace $T_j(t)$ does not deviate. Based on these deviation characteristics, the 6-bit partial key $k_j$ can be identified.

By applying this operation to the other seven S-boxes s, the 48-bit key data $K_{16}$ can be found.

In such a power analysis, the fact that there is a correlation between the value of the unknown variable $k_j$ anticipated by potential attackers and the power consumption $v_i(t)$ works. This also applies to the timing analysis involving the correlation between values of unknown variables and the measurement time.

Thus, if conversely such a correlation is eliminated, leakage of secret information through side channel analysis can be prevented. Therefore, a technique to mask random numbers in data processed by a cryptographic device is known to eliminate the correlation between data processed by the cryptographic device and data anticipated by potential attackers.

Mainly two kinds of masks, a logical mask and an arithmetic mask, are known as mask methods and which mask to use is decided based on operations constituting a cryptographic algorithm. For example, the logical mask is used for a cryptographic algorithm composed of logical operations and the arithmetic mask is used for a cryptographic algorithm composed of arithmetic operations. It is more efficient to make an operation used for masking and an operation of a cryptographic algorithm commutable. That is, when an operation of a cryptographic algorithm is performed on masked data, the operation is defined in such a way that an operation result after the last unmasking is the same as an operation result obtained when masking is not used from the start. Generally, secret key cryptography frequently uses the logical mask and the public key cryptography frequently uses the arithmetic mask.

There exist some algorithms in secret key cryptographic systems and hash functions that use both a logical operation and an arithmetic operation in one algorithm. In secret key cryptographic systems, such an algorithm is contained in IDEA (International Data Encryption Algorithm) and Seed. In hash functions, such an algorithm is contained in SHA-1 (Secure Hash Algorithm-1). To mask data in such algorithms, it is necessary to use the logical mask in a portion using a logical operation of a cryptographic algorithm and the arithmetic mask in a portion using an arithmetic operation.

In these algorithms, if the processing unit (word) is w bits, an operation of the following formula is performed to mask w-bit data x by a w-bit number R by using an XOR for the logical mask:

$$x'=x^\wedge R \text{ (}^\wedge \text{ is a symbol representing an XOR)}$$

For the arithmetic mask, an operation of the following formula is performed by using a modular subtraction:

$$A=x-R \bmod 2^w$$

In the examples of the above cryptographic algorithms, w=32 bits.

Therefore, in a situation changing from a logical operation to an arithmetic operation in an operation sequence of a cryptographic algorithm, it is necessary to convert data from data that is logically masked (hereinafter, referred to as logically masked data) x' to data that is arithmetically masked (hereinafter, referred to as arithmetically masked data) A. Similarly, in a situation changing from an arithmetic operation to a logical operation, it is necessary to convert data from the arithmetically masked data A to the logically masked data x'.

For example, the simplest method of converting the logically masked data x' into the arithmetically masked data A is a scheme of operating $(x'^\wedge R)-R \bmod 2^w$. However, this scheme is not desirable because $x'^\wedge R=x$ and so unmasked data appears during operation.

As methods of converting the logically masked data x' and the arithmetically masked data A while data is always masked, L. Goubin, "A Sound Method for Switching Between Boolean and Arithmetic Masking", CHES 2001, LNCS 2162, pp. 3-15, 2001 (hereinafter, called the [Goubin2001] method) and J-S. Coron, A. Tchulkine, "A New Algorithm for Switching from Arithmetic to Boolean Masking", CHES 2003, LNCS 2779, pp. 89-97, 2003 (hereinafter, called the [CT2003] method) are known. The [Goubin2001] method proposes a method of converting the logically masked data x' into the arithmetically masked data A and a method of converting the arithmetically masked data A into the logically masked data x'. The latter method is less efficient and the [CT2003] method that seeks to achieve speed enhancement by using a pre-calculated table is proposed.

The method of converting the arithmetically masked data A into the logically masked data x' in the [CT2003] method will be described using FIGS. 8 to 10. The unit in which operations are performed is assumed to be b bits. For the sake of simplicity, b is assumed to be a divisor of w and can be expressed as w=k×b using an integer k.

First, a pre-calculated table G is constructed when the logical mask and the arithmetic mask are in b bits (that is, w=b, k=1). The pre-calculated table is defined by the formula below for each integer from 0 to $2^b-1$:

$$G[I]=((I+r) \bmod 2^b)^\wedge r$$

For the sake of convenience, a b-bit random number is denoted as r. If w=b, r is related with the number R by R=r. The pre-calculated table G is a table composed of $2^b$ pieces of element data and each piece of element data is b-bit data. The arithmetically masked data A can be converted into the logically masked data x' by determining the element data G[A] of the pre-calculated table G. The reason is as follows:

$$G[A] = ((A + r) \bmod 2^b)^\wedge r$$
$$= ((x - r) + r \bmod 2^w)^\wedge r$$
$$= (x \bmod 2^w)^\wedge r$$
$$= x^\wedge r$$
$$= x'$$

FIG. 8 shows the pre-calculated table G when w=b=4 and r=3. The array in FIG. 8 shows values of G[0], G[1], . . . , G[15] from the left in hexadecimal notation. For example, G[9]=0xF.

FIG. 9 shows an algorithm to convert the arithmetically masked data A into the logically masked data x' by the [CT2003] method. The algorithm is an algorithm that outputs, when the arithmetically masked data A in w=k×b bits and the number R are input, the logically masked data x' in w bits.

First, an integer m and the logically masked data x' are set as m=k and x'=0 (steps S110, 120).

Next, the random number r is subtracted from the arithmetically masked data A under mod $2^{mb}$ (step S130).

The number R is divided into an upper number $R_1$ and a lower number $R_2$ at the b-th bit number from LSB (Least Significant Bit) (step S140). That is, the upper number $R_1$ is composed of the upper (m−1)b bits of the number R and the lower number $R_2$ is composed of the lower b bits.

The lower number $R_2$ is added to the arithmetically masked data A under mod $2^{mb}$ (step S150).

Next, for an integer m, whether m=1 is determined (step S160). If m=1, logically masked upper data $x'_1$ is calculated by the formula below (steps S170, S180):

$$x'_1=(G[A]^\wedge R_2)^\wedge r$$

Subsequently, the obtained logically masked upper data $x'_1$ is arranged in the most significant b bits of the logically masked data x' (step S190) before terminating the algorithm.

If m>1, processing below is performed.

The arithmetically masked data A is divided, like the number R, into arithmetically masked upper data $A_1$ and arithmetically masked lower data $A_2$ (step S161).

To relate carrying-over (the (b+1)-th bit value caused by $A_2$+r) in step S130 and step S150 to the arithmetically masked upper data $A_1$, the formula below is calculated (steps S162, S163). "Carrying-over" herein may be replaced with "carry".

$$A_1=(A_1+C[A_2])-\gamma \bmod 2^{(m-1)b}$$

Subsequently, logically masked lower data $x'_2$ is calculated by the formula below (steps S164, S165).

$$x'_2=(G[A_2]^\wedge R_2)^\wedge r$$

Subsequently, the logically masked lower data $x'_2$ is arranged in such a way that the least significant bit LSB of the logically masked lower data $x'_2$ is aligned with the lower (k−m)b-th bit of the logically masked data x' (step S166).

Subsequently, the integer m is updated to m=m−1 (step S167) to repeat from step S130.

When carrying-over (carry) from lower digits is adjusted in step S130 and step S150 in the above algorithm, a pre-calculated table C and the b-bit random number γ are used to mask the carrying-over information. The pre-calculated table C is defined for each integer I from 0 to $2^b-1$ as follows:

$$C[I]=\gamma \text{ (when } I+r<2^b)$$

$$C[I]=\gamma+1 \text{ (when } I+r \geq 2^b)$$

The pre-calculated table C is a table composed of $2^b$ pieces of element data and each piece of element data is b-bit data.

FIG. 10 shows the pre-calculated table C when b=4, r=3, and γ=9. The array in FIG. 10 shows values of C[0], C[1], . . . , C[15] from the left in hexadecimal notation. For example, C[0xE]=0xA.

BRIEF SUMMARY OF THE INVENTION

However, according to the method of converting the arithmetically masked data A into the logically masked data x' in the [CT2003] method described above, two storage areas of $b \times 2^b$ bits are needed as areas to store the pre-calculated tables G, C. When, for example, b=4, a storage area of 128 bits (=16 bytes) is needed and when b=8, a storage area of 4,096 bits (=512 bytes) is needed. When b=16, however, a storage area of 2,097,152 bits (=262,144 bytes) is needed, which is not realistic.

Therefore, the storage area when b=8 or so actually has a reasonable size, but when mounted in a device with a small storage capacity like a smart card, there is a problem that even the 512-byte pre-calculated tables G, C squeeze resources or cannot be implemented.

According to discussions of the present inventors, this problem is considered to be solvable if the size of the pre-calculated table needed when an upper (k−1)b-bit addition result is obtained by a kb-bit number A and a b-bit number r being mutually added can be reduced. That is, if the size of the pre-calculated table C needed when carrying-over (the (b+1)-th bit value caused by $A_2+r$) in step S130 and step S150 is related to the arithmetically masked upper data $A_1$ can be reduced, the problem is considered to be solvable.

An object of the present invention is to provide an operation unit and a program capable of reducing the size of a pre-calculated table needed when an upper (k−1)b-bit addition result is obtained by a kb-bit number A and a b-bit number r being mutually added.

One aspect of the present invention is an operation unit that generates a pre-calculated table C' including $(4 \times 2^{b/2})$ pieces of b-bit element data C'[y] individually readable by $(4 \times 2^{b/2})$ indices y ($0 \leq y < 4 \times 2^{b/2}$) before processing to obtain an addition result of upper (k−1)b bits by adding a kb-bit number A composed of a number $A_1$ of upper (k−1)b bits and a number $A_2$ of lower b bits (b>4) and a number r of b bits and can propagate carrying-over from the addition result of the number $A_2$ and the number r to the number $A_1$ based on the pre-calculated table C' during the processing of the addition, comprising: a unit that generates a random number γ of the b bits; a storage unit to store each of the indices y and the pre-calculated table C' including each piece of element data C'[y] associated with each of the indices y; an unit that sets first to $2^{b/2}$-th pieces of the element data C'[y] of the pre-calculated table C' in the storage unit to values C'[y]=$2^{b/2}$ ($0 \leq y < 2^{b/2} - r_H - 1$), C'[y]=$2 \times 2^{b/2}$ (y=$2^{b/2} - r_H - 1$), and C'[y]=$3 \times 2^{b/2}$ ($2^{b/2} - r_H \leq y < 2^{b/2}$) based on the index y and a number $r_H$ of upper b/2 bits of the number r; the unit that sets ($2^{b/2}+1$)-th to ($2 \times 2^{b/2}$)-th pieces of the element data C'[y] of the pre-calculated table C' in the storage unit to the value C'[y]=$\gamma(2^{b/2} \leq y < 2 \times 2^{b/2})$ based on the index y and the random number γ; the unit that sets ($2 \times 2^{b/2}+1$)-th to ($3 \times 2^{b/2}$)-th pieces of the element data C'[y] of the pre-calculated table C' in the storage unit to the values C'[y]=$\gamma(2 \times 2^{b/2} \leq y < 3 \times 2^{b/2} - r_L)$ and C'[y]=$\gamma+1(3 \times 2^{b/2} - r_L \leq y < 3 \times 2^{b/2})$ based on the index y, the random number γ, and the number $r_L$ of lower b/2 bits of the number r; the unit that sets ($3 \times 2^{b/2}+1$)-th to ($4 \times 2^{b/2}$)-th pieces of the element data C'[y] of the pre-calculated table C' in the storage unit to the value C'[y]=$\gamma+1(3 \times 2^{b/2} \leq y < 4 \times 2^{b/2})$ based on the index y and the random number γ; a first extraction unit that extracts the number $A_1$ and the number $A_2$ from the number A; a second extraction unit that extracts a number $A_H$ of upper b/2 bits and a number $A_L$ of lower b/2 bits of the number $A_2$ from the number $A_2$; a first reading unit that sets the values of the ($4 \times 2^{b/2}$) pieces of the element data C'[y] and then reads first element data C'[$A_H$] from the pre-calculated table C' in the storage unit by using the extracted number $A_H$ as the index y; a second reading unit that reads second element data C'[C'[$A_H$]+$A_L$] from the pre-calculated table C' in the storage unit by using a sum of the first element data C'[$A_H$] and the extracted number $A_L$ as the index y; and a carrying-over propagation unit that propagates carrying-over to the number $A_1$ by calculating $A_1$+C'[C'[$A_H$]+$A_L$]−γ mod $2^{(k-1)b}$ based on the second element data C'[C'[$A_H$]+$A_L$], the random number γ, the number $A_1$, and a number of bits (k−1)b of the number $A_1$.

One aspect of the present invention is represented as a device, but is not limited to the device and may be represented as a method, program, or computer readable storage medium storing a program.

In one aspect of the present invention, regarding an addition of a kb-bit number A and a b-bit random number r, element data of a pre-calculated table C' is set based on a sum $A_H+r_H$ of a value $A_H$ of upper b/2 bits of a number $A_2$, which is lower b bits of the number A, and a value $r_H$ of upper b/2 bits of the random number r and the sum $A_L+r_L$ of a value $A_L$ of lower b/2 bits of the number $A_2$ and a value $r_L$ of lower b/2 bits of the random number r in such a way that presence/absence of carrying-over of $A_2+r$ is indicated and thus, compared with the method described in the [CT2003] method, the size of the pre-calculated table needed to obtain an addition result of upper (k−1)b bits by mutually adding the kb-bit number A and the b-bit number r can be reduced.

According to the present invention, as described above, the size of a pre-calculated table needed when an upper (k−1)b-bit addition result is obtained by a kb-bit number A and a b-bit number r being mutually added can be reduced.

BRIEF DESCRIPTION OF THE SEVERAL
VIEWS OF THE DRAWING

FIG. 3 is a diagram exemplifying the pre-calculated table C in the embodiment;

DETAILED DESCRIPTION OF THE INVENTION

Figure 6:
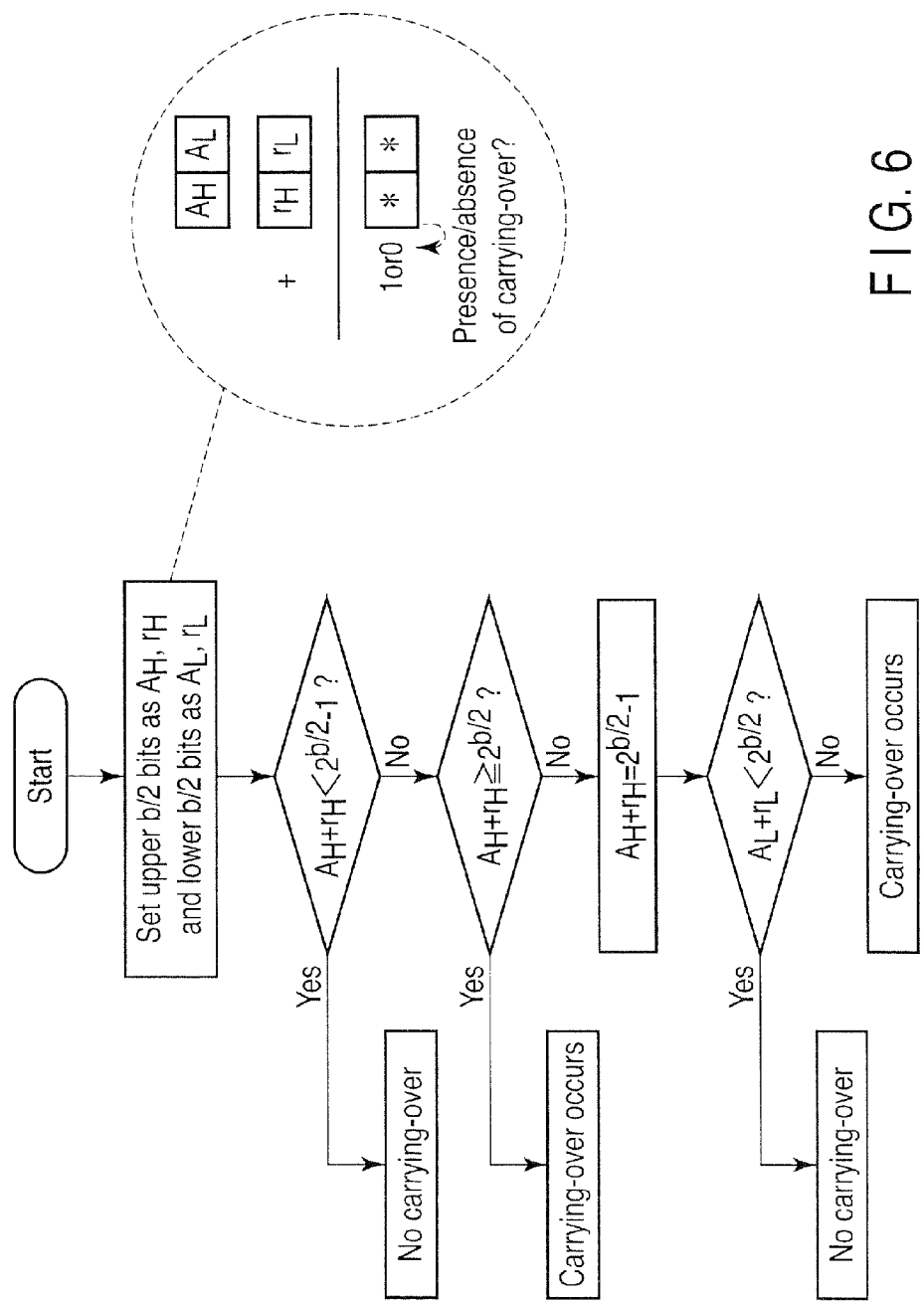
FIG. 6 is a flow chart providing an overview of the present invention.

Each embodiment of the present invention will be described below using drawings, but first an overview of the present invention will be provided with reference to FIG. 6.

When a pre-calculated table C' is generated, whether a value A+r obtained by masking an integer A in the range of 0 and $2^b-1$ with an integer r is smaller than $2^b$ (determination of presence/absence of carrying-over) is determined separately for upper b/2 bits and lower b/2 bits.

The number of upper b/2 bits of the integer A is denoted as $A_H$ and the number of lower b/2 bits is denoted as $A_L$. For the integer r, the number of upper b/2 bits is similarly denoted as $r_H$ and the number of lower b/2 bits is denoted as $r_L$ (Example, when r=0x19, $r_H$=1, $r_L$=9).

If, for example, the addition result of the upper b/2 bits $A_H$, $r_H$ satisfies $A_H+r_H<2^{b/2}-1$, $A+r<2^b$ (that is, no carrying-over) can be determined to be satisfied regardless of the values of $A_L$ and $r_L$. Therefore, if there is no carrying-over, the pre-calculated table C' is generated in such a way that the value γ (random value) is read when the pre-calculated table C' is referred to. In this case, more specifically, the size of $(2^{b/2}-r_H-1)\times b$ bits when b-bit values C'[$A_H$] are obtained by setting the number $A_H$ as an index y (however, $0 \leq y < 2^{b/2}-r_H-1$) (example, the sizes of 14 values C'[0x00] C'[0x1D]=0x10, ..., 0x10 in the 0-th row in FIG. 3) and the size of $2^{b/2} \times b$ bits when b-bit values γ are obtained by setting the value obtained by adding the number $A_L$ to the value C'[$A_H$] obtained by using the index y (0x10+$A_L$) as an index y (however, $2^{b/2} \leq y < 2 \times 2^{b/2}$) (example, the sizes of 16 values C'[0x10], ..., C'[0x1F]=0x56, ..., 0x56 in the first row in FIG. 3) are needed.

Next, if the addition result of the upper b/2 bits $A_H$, $r_H$ satisfies $A_H+r_H \geq 2^{b/2}$, $A+r \geq 2^b$ (that is, carrying-over occurs) can be determined to be satisfied regardless of the values of $A_L$ and $r_L$. Therefore, if carrying-over occurs, the pre-calculated table C' is generated in such a way that the value γ+1 (carrying-over information with a random value) is read when the pre-calculated table C' is referred to. In this case, more specifically, the size of $r_H \times b$ bits when b-bit values C'[$A_H$] are obtained by setting the number $A_H$ as an index y (however, $2^{b/2}-r_H \leq y < 2^{b/2}$) (example, the size of one value C'[0x0F]=0x30 in the 0-th row in FIG. 3) and the size of $2^{b/2} \times b$ bits when b-bit values γ are obtained by setting the value obtained by adding the number $A_L$ to the value C'[$A_H$] obtained by using the index y (0x30+$A_L$) as an index y (however, $3 \times 2^{b/2} \leq y < 4 \times 2^{b/2}$) (example, the sizes of 16 values C'[0x30], ..., C'[0x3F]=0x57, ..., 0x57 in the third row in FIG. 3) are needed.

Lastly, if the addition result of the lower b/2 bits $A_L$, $r_L$ is $A_L+r_L<2^{b/2}$ when the addition result of the upper b/2 bits $A_H$, $r_H$ is $A_H+r_H=2^{b/2}-1$, $A+r<2^b$ (that is, no carrying-over) can be determined and otherwise, $A_L+r_L+r_L \geq 2^{b/2}$ (that is, carrying-over occurs) is satisfied. Therefore, if carrying-over occurs, the pre-calculated table C' is generated in such a way that the value γ is read if there is no carrying-over and the value γ+1 is read if carrying-over occurs when the pre-calculated table C' is referred to. In these cases, more specifically, the size of 1×b bits when b-bit values C'[$A_H$] are obtained by setting the number $A_H$ as an index y (however, $y=2^{b/2}-r^H-1$) (example, the size of one value C'[0x0E]=0x20 in the 0-th row in FIG. 3), the size of $(2^{b/2}-r_L) \times b$ bits when b-bit values γ are obtained by setting the value obtained by adding the number $A_L$ to the value C'[$A_H$] obtained by using the index y (0x20+$A_L$) as an index y (however, $2 \times 2^{b/2} \leq y < 3 \times 2^{b/2}-r_L$) (example, the sizes of seven values C'[0x20], ..., C'[0x26]=0x56, ..., 0x56 in the second row in FIG. 3), and the size of $r_L \times b$ bits when b-bit values γ+1 are obtained by setting the value obtained by adding the number $A_L$ to the value C'[$A_H$] (0x20+$A_L$) as an index y (however, $3 \times 2^{b/2} \leq y < 3 \times 2^{b/2}$) (example, the sizes of nine values C'[0x27], ..., C'[0x2F]=0x57, ..., 0x57 in the second row in FIG. 3) are needed.

The size of this pre-calculated table C' is a value obtained by adding up all these sizes and, more specifically, a value obtained by adding up the size of $(2^{b/2}-r_H-1) \times b$ bits, the size of $2^{b/2} \times b$ bits, the size of $r_H \times b$ bits, the size of $2^{b/2} \times b$ bits, the size of 1×b bits, the size of $(2^{b/2}-r_L) \times b$ bits, and the size of $r_L \times b$ bits. That is, the size of the pre-calculated table C' becomes $4 \times 2^{b/2} \times b$ bits, namely, $4b \times 2^{b/2}$ bits.

Comparison of this size with the size $b \times 2^b$ bits of the conventional pre-calculated table C shows that the ratio of reduction is $(4b \times 2^{b/2})/(b \times \times 2^b) = 4/2^{b/2}$. This ratio is, for example, 1 when b=4 and the size is reduced from 1 depending on the value of b when b>4 and reduced significantly to 1/64 when b=16.

From the foregoing, the size of a pre-calculated table can be reduced in the [CT2003] method. Thus, a pre-calculated table can be implemented more easily in a device such as an IC card in which resources are subject to severe constraints.

First Embodiment

Figure 1:
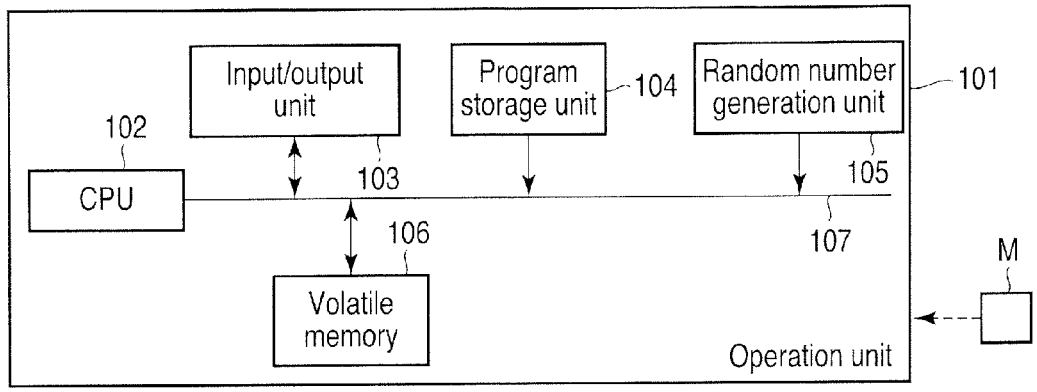
FIG. 1 is a schematic diagram of an operation unit according to the first embodiment of the present invention.

FIG. 1 is a schematic diagram showing the configuration of an operation unit according to the first embodiment of the present invention. An operation unit 101 is constituted as an encryption processing unit of a computer of a smart card or the like and performs encryption processing by hardware or software. More specifically, the operation unit 101 includes a CPU (Central Processing Unit) 102, an input/output unit 103, a program storage unit 104, a random number generation unit 105, a volatile memory 106, and a bus 107. The operation unit 101 can be embodied by a hardware configuration or a combined configuration of hardware resources and software. As the software in the combined configuration, a program installed on a computer to be an operation unit in advance from a network or a computer readable storage medium M to realize the function of the operation unit 101 is used. Here, each function is to be realized in a form in which a program stored in the program storage unit 104 is executed by the CPU 102. The program contains at least a sub-program to add data.

Figure 2:
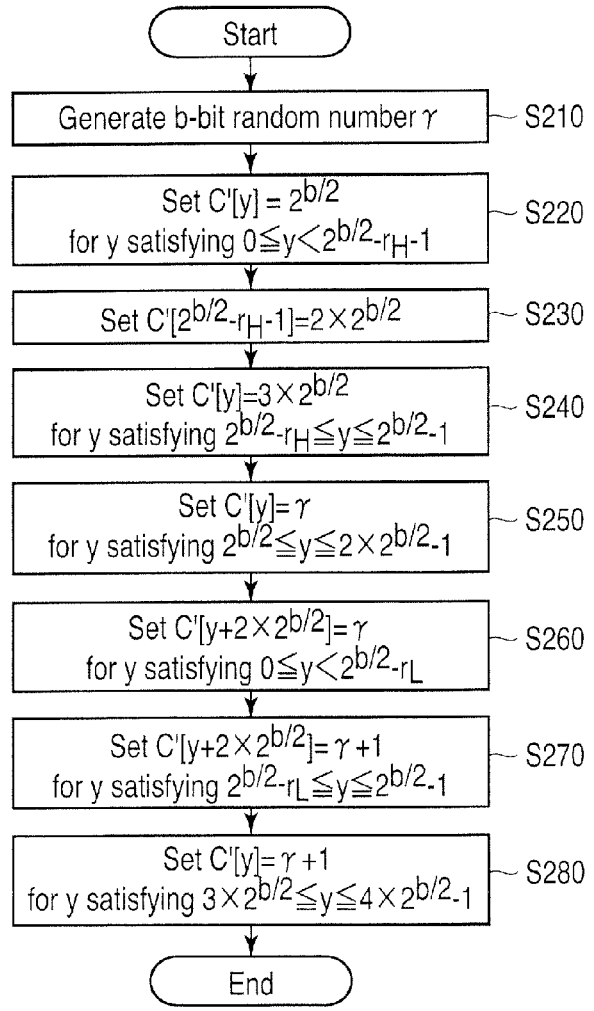
FIG. 2 is a flow chart showing a procedure for generating the pre-calculated table C in the embodiment.
Figure 4:
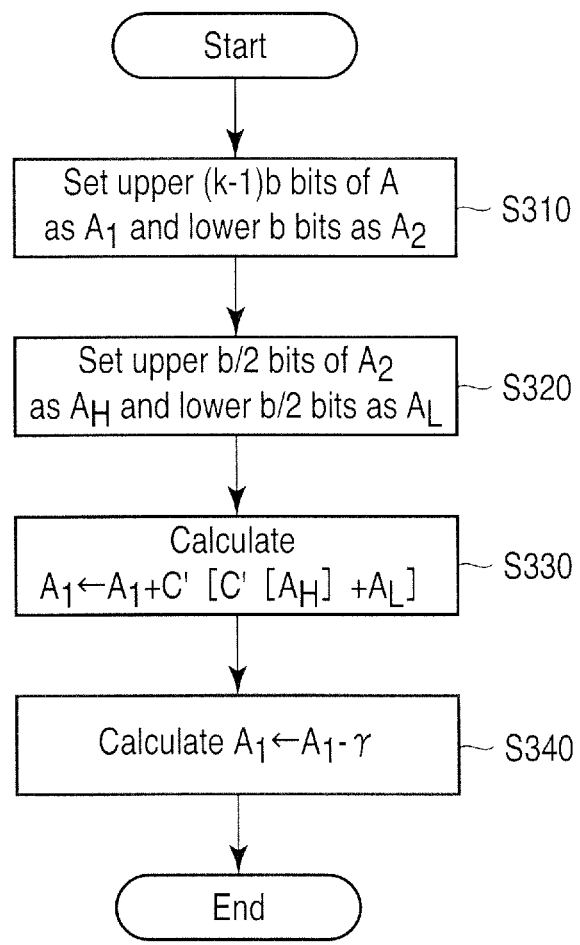
FIG. 4 is a flow chart showing an addition procedure in the embodiment.
Figure 5:
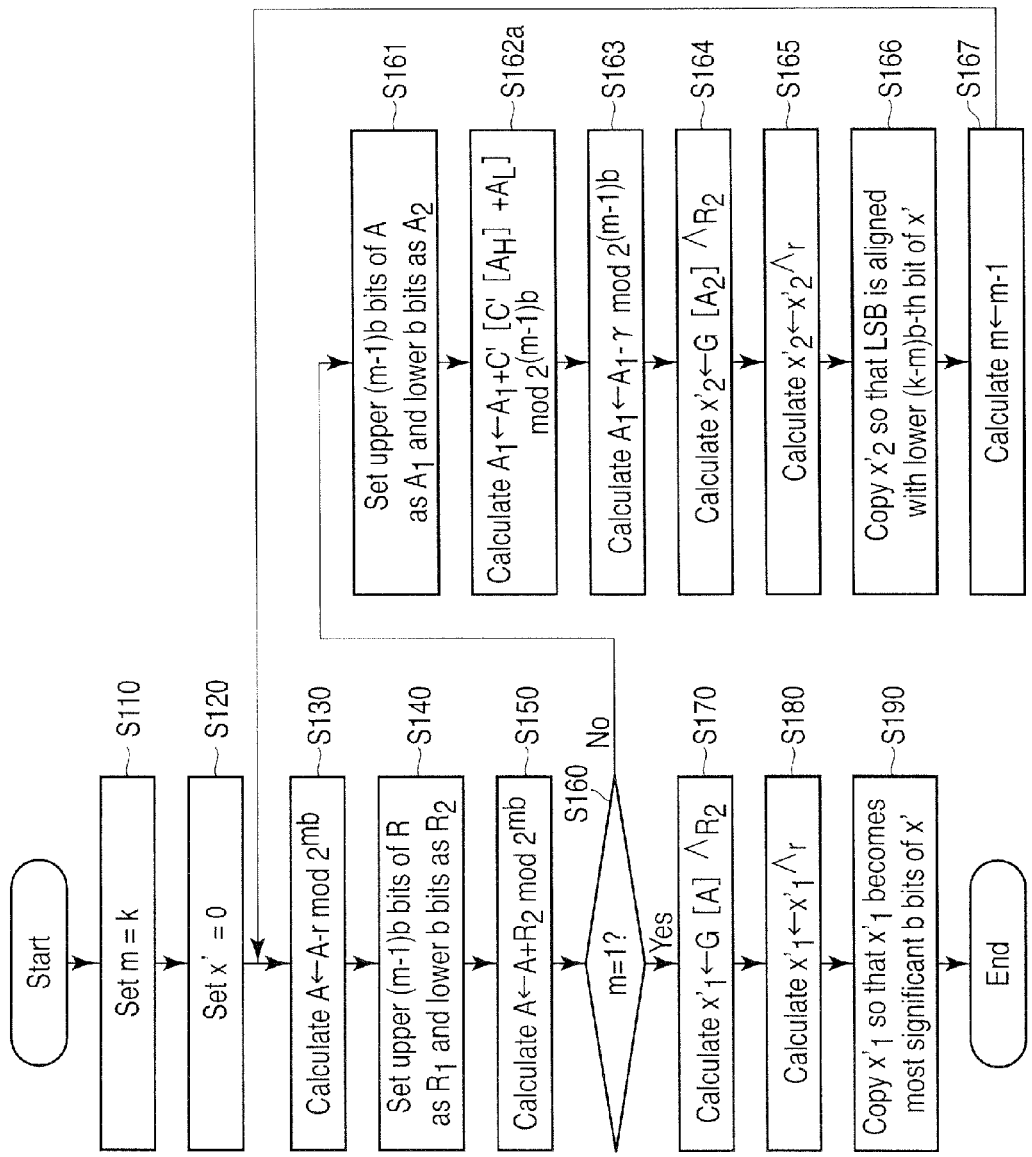
FIG. 5 is a flow chart showing a conversion procedure from an arithmetic mask into a logical mask applied to the operation unit according to a second embodiment of the present invention.

The CPU 102 has a function to perform processing shown in FIGS. 2, 4, and 5 by executing programs stored in the program storage unit 104.

The input/output unit 103 is an interface between inside the operation unit 101 and outside thereof and has, for example, a function to input the numbers A, r to be operated into the operation unit 101 and a function to output an operation result obtained by the CPU 102 to outside of the operation unit 101.

The program storage unit 104 is a storage device that can be read from the CPU 102, is, for example, a ROM (Read Only Memory) or EEPROM (electrically erasable/programmable ROM), and has programs of the processing shown in FIGS. 2, 4, and 5 stored therein. Incidentally, the program storage unit 104 may be configured to install and hold programs from outside.

The random number generation unit 105 generates a random number under control of the CPU 102 and has a function to generate, for example, a b-bit random number γ. The random number generation unit 105 may be realized by independent hardware or the CPU 102 and a program. Alternatively, the random number generation unit 105 may be omitted from the operation unit 101 so that a random number generated outside is input through the input/output unit 103.

The volatile memory 106 is a storage device that can be read/written into from the CPU 102, is, for example, a RAM (Random Access Memory), and stores data necessary for calculation, data in the process of calculation, and calculation results, for example, the pre-calculated table C', number A, number r, random number γ, and addition result.

Next, operations of the operation unit configured as described above will be described using FIGS. 2 to 4. The operations will be described in the order of generation processing of a pre-calculated table and addition processing (carrying-over propagation processing).

(Generation Processing of the Pre-Calculated Table C': FIG. 2)

When the input/output unit 103 receives the number A of kb bits composed of the number $A_1$ of upper (k−1)b bits and the number $A_2$ of lower b bits, the number r of b bits, and an addition command of these numbers A, r from, for example, an encryption processing unit (not shown), the input/output unit 103 outputs these numbers A, r and the addition command to the CPU 102. Incidentally, the numbers A, $A_1$, $A_2$ are each called "arithmetically masked data".

When the CPU 102 receives these numbers A, r and the addition command, the CPU 102 activates, as shown in FIG. 3, the random number generation unit 105 to generate the pre-calculated table C' before processing to obtain an addition result of upper (k−1)b bits by adding these numbers A, r.

When activated by the CPU 102, the random number generation unit 105 generates a b-bit random number γ (step S210). The random number γ is sent to the CPU 102 and stored in the volatile memory 106 by the CPU 102. Step S210 is described by taking an example in which step S210 is performed first, but the present embodiment is not limited to this and step S210 may be performed any time before steps S250, S260, S270 and S280 in which the random number γ is used. Steps S220 to S280 can be performed in any order.

Next, the CPU 102 writes the pre-calculated table C' including ($4×2^{b/2}$) indexes y ($0≤y<4×2^{b/2}$) and each piece of element data C'[y] associated with each of indexes y into the volatile memory 106. The element data C'[y] contains ($4×2^{b/2}$) pieces of data and each piece is a b-bit value that can be individually read by each of indexes y. At this stage, however, the value of each piece of the element data C'[y] is not set. The index y is an integer.

The CPU 102 sets the first to $2^{b/2}$-th pieces of the element data C'[y] of the pre-calculated table C' in the volatile memory 106 to the following values based on the index y of $0≤y<2^{b/2}$ and the number $r_H$ of upper b/2 bits of the number r (steps S220 to S240).

$$C'[y]=2^{b/2} (0≤y<2^{b/2}-r_H-1: \text{that is, } y+r_H<2^{b/2}-1)$$

$$C'[y]=2×2^{b/2} (y=2^{b/2}-r_H-1: \text{that is, } y+r_H=2^{b/2}-1)$$

$$C'[y]=3×2^{b/2} (2^{b/2}-r_H≤y<2^{b/2}: \text{that is, } y+r_H>2^{b/2}-1)$$

It is assumed here that the value of the arithmetically masked upper data $A_H$ described later is input into the index y and the above three cases of element data C'[y] correspond to cases of $A_H+r_H<2^{b/2}-1$, $A_H+r_H=2^{b/2}-1$, and $A_H+r_H>2^{b/2}-1$ respectively.

The value of the above element data C'[y] indicates which element data C'[ ] of the pre-calculated table to look at next in accordance with the value of the computationally masked upper data $A_H$ and shows that $C'[2^{b/2}]$ should be referred to in the uppermost case, $C'[2×2^{b/2}]$ in the second case, and $C'[3×2^{b/2}]$ in the third case.

Next, the CPU 102 sets the first to the ($2^{b/2}+1$)-th to ($2×2^{b/2}$)-th pieces of the element data C'[y] of the pre-calculated table C' in the volatile memory 106 to the following value based on the index y of $2^{b/2}≤y<2×2^{b/2}$ and the random number γ (step S250).

$$C'[y]=γ$$

It is assumed here that the value of the arithmetically masked lower data $A_L$ described later is input into $y-2^{b/2}$ and this means that if $A_H+r_H<2^{b/2}-1$, the random number γ is returned regardless of the value of the arithmetically masked lower data $A_L$.

Next, the CPU 102 sets the ($2×2^{b/2}+1$)-th to ($3×2^{b/2}$)-th pieces of the element data C'[y] of the pre-calculated table C' in the volatile memory 106 to the following values based on the index y of $2×2^{b/2}≤y<3×2^{b/2}$, the random number γ, and the number $r_L$ of lower b/2 bits of the number r (steps S260, S270).

$$C'[y]=γ (2×2^{b/2}≤y<3×2^{b/2}-r_L: \text{that is, } y+r_L<2^{b/2})$$

$$C'[y]=γ+1 (3×2^{b/2}-r_L≤y<3×2^{b/2}: \text{that is, } y+r_L≥2^{b/2})$$

It is assumed here that the value of the arithmetically masked lower data $A_L$ is input into the index $y-2×2^{b/2}$ and the above two cases correspond to cases of $A_L+r_L<2^{b/2}$ and $A_L+r_L≥2^{b/2}$, respectively.

Lastly, the CPU 102 sets the ($3×2^{b/2}+1$)-th to ($4×2^{b/2}$)-th pieces of the element data C'[y] of the pre-calculated table C' in the volatile memory 106 to the following value based on the index y of $3×2^{b/2}≤y<4×2^{b/2}$ and the random number γ (step S280).

$$C'[y]=γ+1$$

It is assumed here that the value of the arithmetically masked lower data $A_L$ is input into $y-3×2^{b/2}$ and this means that if $A_H-r_H≥2^{b/2}$, the carrying-over information with the random number γ+1 is returned regardless of the value of the arithmetically masked lower data $A_L$.

The size of the pre-calculated table C' configured as described above becomes $4b×2^{b/2}$ bits.

FIG. 3 shows the pre-calculated table C' when b=8, r=0x19, and γ=0x56. The pre-calculated table C' uses hexadecimal notation. In the array in FIG. 3, the vertical column represents multiples of $2^{b/2}$ of the index and the horizontal row represents the index less than $2^{b/2}$. For example, when the vertical index is 1 and the horizontal index is 5, a ($1×2^{b/2}+5=21$)-th element of the pre-calculated table C' is referred to and C'[21]=0x56 is obtained.

The row of the vertical index 0 has $r_H=1$ and thus, $2^{b/2}-r_H-1=14$. Therefore, elements of the pre-calculated table C' whose horizontal index is 13 (=0x0D) or less have $2^{b/2}=0x10$, the element whose horizontal index is 14 (=0x0E) has $2×2^{b/2}=0x20$, and the element whose horizontal index is 15 (=0x0F) or more (15 only) has $3×2^{b/2}=0x30$.

All element data in the row of the vertical index 1 has the random number γ=0x56.

All element data in the row of the vertical index 3 has the carrying-over information with the random number γ+1=0x57.

The row of the vertical index 2 has $r_L=9$ and thus, $2^{b/2}-r_L=7$. Therefore, element data of the pre-calculated table C' whose horizontal index is 6 or less has the random number γ=0x56 and element data of the pre-calculated table C' whose horizontal index is 7 or more has the carrying-over information with the random number γ+1=0x57.

(Addition Processing: FIG. 4)

First, the CPU 102 extracts the numbers $A_1$, $A_2$ from the input number A. More specifically, upper (k−1)b bits of the arithmetically masked data A are set as the arithmetically masked upper data $A_1$ and lower b bits are set as the arithmetically masked lower data $A_2$ (step S310).

To calculate an addition result A+r, it is necessary to convey carrying-over information ((b+1)-th bit) in the arithmetically masked lower data $A_2 \leftarrow A_2 + r$ of the addition result to the arithmetically masked upper data $A_1$ of the addition result. That is, it is necessary to make an addition $A_1 \leftarrow A_1 + 0$ of the carrying-over information "0" if there is no carrying-over information of the arithmetically masked lower data $A_2 + r$ of the addition result and to make an addition $A_1 \leftarrow A_1 + 1$ of the carrying-over information "1" if there is carrying-over information. The addition is different depending on whether there is carrying-over information and this situation is not desirable from the viewpoint of preventing side channel analyses.

Thus, a b-bit random number γ is used and if there is no carrying-over information, an addition $A_1 \leftarrow (A_1 + \gamma) - \gamma$ of the carrying-over information "0" is made and if there is carrying-over information, an addition $A_1 \leftarrow (A_1 + \gamma + 1) - \gamma$ of the carrying-over information "1" is made.

Whether to add the random number γ or carrying-over information with the random number γ+1 corresponds to whether $A_2 + r < 2^{b/2}$ and this can be determined by referring to the pre-calculated table C'.

Thus, the CPU 102 extracts the number $A_H$ of upper b/2 bits of the number $A_2$ and the number $A_L$ of lower b/2 bits from the number $A_2$. That is, upper b/2 bits of the arithmetically masked lower data $A_2$ are set as the arithmetically masked upper data $A_H$ and lower b/2 bits thereof as the arithmetically masked lower data $A_L$ (step S320). Steps S310 and S320 are performed after step S280 described above for convenience of description, but the present invention is not limited to this and steps S310 and S320 may be performed any time between step S210 and step S280.

Next, the CPU 102 sets the extracted number $A_H$ as the index y to read the first element data $C'[A_H]$ from the pre-calculated table C' in the volatile memory 106. The processing of reading the first element data $C'[A_H]$ is performed after step S280 described above.

The CPU 102 sets the addition of the first element data $C'[A_H]$ and the extracted number $A_L$ as the index y to read the second element data $C'[C'[A_H]+A_L]$ from the pre-calculated table C' in the volatile memory 106.

The CPU 102 propagates carrying-over to the number $A_1$ by calculating $$A_1 + C'[C'[A_H]+A_L]\gamma \bmod 2^{(k-1)b}$$

based on the second element data $C'[C'[A_H]+A_L]$, random number γ, number $A_1$, and number of bits (k−1)b of the number $A_1$ (steps S330, S340).

According to the first embodiment, as described above, the size of a pre-calculated table needed when an upper (k−1)b-bit addition result is obtained by mutually adding a kb-bit number A and a b-bit number r can be reduced.

To add supplementary remarks, the arithmetically masked upper data $A_1$ generated in step S340 is upper (k−1)b bits of the addition result A+r, the carrying-over propagation from lower b bits is performed based on the pre-calculated table C' while being masked by the random number γ and so has resistance to side channel analyses. Further, the size of the pre-calculated table C' is $4b \times 2^{b/2}$ bits and comparison with the size $b \times 2^b$ bits of the conventional pre-calculated table C shows that the ratio of reduction is $(4b \times 2^{b/2})/(b \times 2^b) = 4/2^{b/2}$.

This ratio is, for example, 1 when b=4 and the ratio is 1/4 when b=8 and reduced significantly to 1/64 when b=16.

The first embodiment follows the [CT2003] method and thus, the size of a pre-calculated table can be reduced while retaining resistance to side channel analyses so that a pre-calculated table can be implemented more easily in a device such as a smart card in which resources are subject to severe constraints.

Second Embodiment

Figure 9:
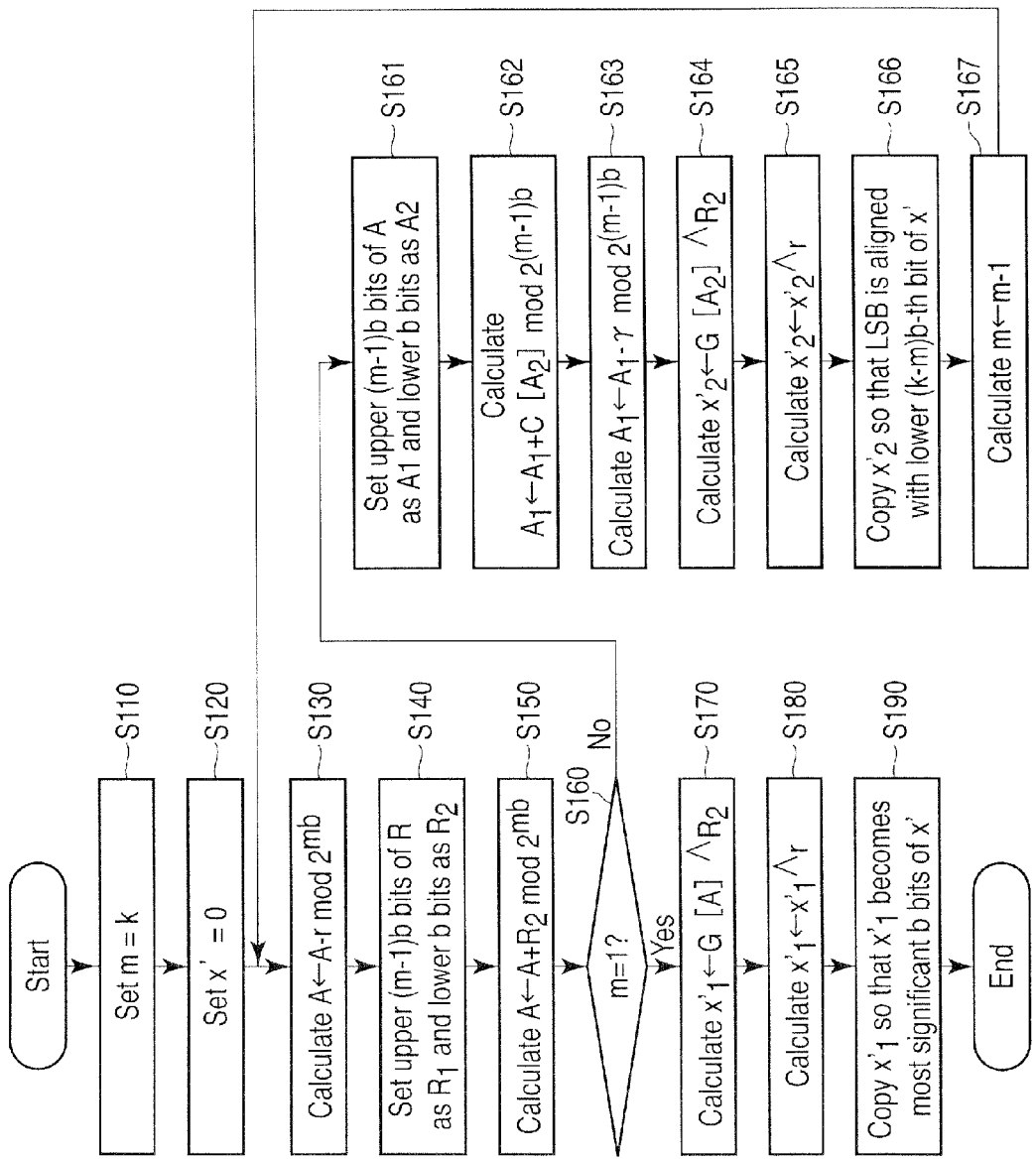
FIG. 9 is a flow chart showing a conventional conversion procedure from the arithmetic mask into the logical mask.
Figure 10:
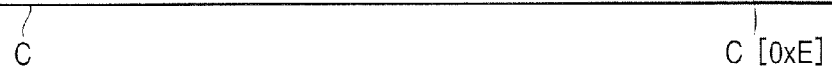
FIG. 10 is a diagram exemplifying the conventional pre-calculated table C.

Next, an operation unit according to the second embodiment of the present invention will be described, but the same reference numerals are attached to the same portions as those in FIG. 9 and a detailed description thereof is omitted to focus on different portions.

The present embodiment is the application of the first embodiment to a conversion method from a conventional arithmetic mask to a logical mask. The hardware configuration of the configuration of the operation unit 101 is the same as that shown in FIG. 1 and the software configuration is a configuration in which a program to perform processing shown in FIG. 5 is added into the program storage unit 104.

The added program is a program to perform conversion processing from an arithmetic mask to a logical mask and performs, instead of the conventional step S162 shown in FIG. 9, step S162a (processing using the pre-calculated table C' in the first embodiment) described later (other steps than step S162a are performed in the same manner as each conventional step shown in FIG. 9).

To add supplementary remarks, steps S161 to S163 shown in FIG. 5 correspond to steps S310 to S340 and steps S210 to S280 (generation processing of the pre-calculated table C') in the first embodiment are performed before step S162a is finally performed. Normally, steps S210 to S280 are performed in advance before step S110 shown as a first step in FIG. 5.

Figures 7, 8:
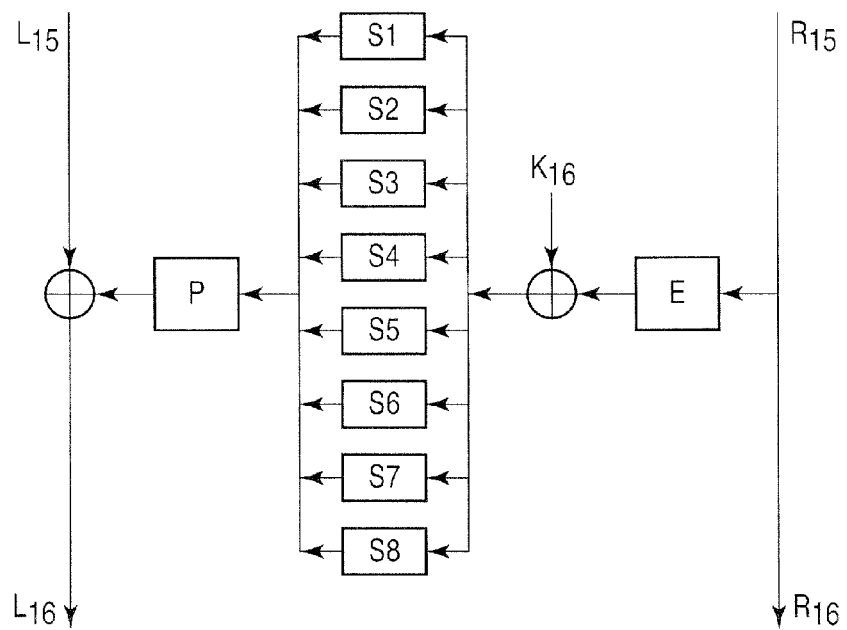
FIG. 7 is a diagram showing a 16-th stage of a data conversion unit of a general DES.
FIG. 8 is a diagram exemplifying the conventional pre-calculated table G.

In any case, with the processing shown in FIG. 5 being performed, the volatile memory 106 is used to store, in addition to storage content in the first embodiment, a second pre-calculated table G, an integer m, and arithmetically masked data x'. The second pre-calculated table G includes, as shown in FIG. 8, $2^b$ indices I ranging from 0 to $2^b - 1$ and $2^b$ pieces of element data $G[I] = ((I+r) \bmod 2^b) \char`\^ r$ that can individually be read by each of the indices I.

Next, the operation of the operation unit configured as described above will be described using FIG. 5.

It is assumed here that the CPU 102 has generated the pre-calculated table C' described in the first embodiment by the processing in steps S210 to S280 and has written the pre-calculated table C' into the volatile memory 106. Similarly, the CPU 102 generates the second pre-calculated table G based on the $2^b$ indices I ranging from 0 to $2^b - 1$, the random number r, and the number of bits b and writes the second pre-calculated table G into the volatile memory 106.

The input/output unit 103 writes the kb-bit number A composed of the upper (k−1)b-bit number $A_1$ and the lower b-bit number $A_2$ and the mb-bit number R composed of the upper (m−1)b-bit number $R_1$ and the lower b-bit number $R_2$ into the volatile memory 106 by inputting the number A and the number R into the operation unit 101.

Subsequently, the CPU 102 sets the integer m and the logically masked data x' to m=k and x'=0 respectively and writes the integer m and the logically masked data x' into the volatile memory 106 (steps S110 to S120).

The CPU 102 subtracts the random number r from the number A as arithmetically masked data under mod $2^{mb}$ (step S130). The subtraction result $A \leftarrow A-r$ mod $2^{mb}$ is obtained from this subtraction.

After the subtraction, the CPU 102 extracts the number $R_1$ of upper (m−1)b bits and the number $R_2$ of lower b bits (step S140).

After the extraction, the CPU 102 adds the number $R_2$ to the number A under mod $2^{mb}$ (step S150). The addition result $A \leftarrow A-R_2$ mod $2^{mb}$ is obtained from this addition.

After the addition, the CPU 102 determines whether the integer m in the volatile memory 106 is m=1.

If m=1 as a result of the determination, the CPU 102 uses the number A after the addition as the index I to read the element data G[A] from the pre-calculated table G in the volatile memory 106. Then, the CPU 102 calculates logically masked upper data $x'_1$ to a value of $x'_1=(G[A]\char`\^ R_2)\char`\^ r$ (steps S170 to S180).

The CPU 102 arranges the logically masked upper data $x'_1$ obtained by the above calculation in the most significant b bits of the logically masked data x' in the volatile memory 106 (step S190).

On the other hand, if m>1 as a result of the determination in step S160, steps S161, S162a, and step S163 are sequentially performed as processing similar to the processing of steps S310 to S340.

More specifically, the CPU 102 extracts the numbers $A_1$, $A_2$ from the number A after the addition in step S150. More concretely, the CPU 102 sets upper (k−1)b bits of the arithmetically masked data A as the arithmetically masked upper data $A_1$ and lower b bits as the arithmetically masked lower data $A_2$ (step S161).

Next, in contrast to step S162 described above, the CPU 102 performs step S162a described below. That is, the CPU 102 extracts, like the above step, the number $A_H$ of upper b/2 bits of the number $A_2$ and the number $A_L$ of lower b/2 bits from the number $A_2$.

Next, the CPU 102 sets the extracted number $A_H$ as the index y to read the first element data C'[$A_H$] from the pre-calculated table C' in the volatile memory 106.

The CPU 102 also sets the addition of the first element data C'[$A_H$] and the extracted number $A_L$ as the index y to read the second element data C'[C'[$A_H$]+$A_L$] from the pre-calculated table C' in the volatile memory 106.

The CPU 102 propagates carrying-over to the number $A_1$ by calculating $$A_1 \leftarrow A_1 + C'[C'[A_H]+A_L] - \gamma \bmod 2^{(m-1)b}$$

based on the second element data C'[C'[$A_H$]+$A_L$], random number γ, number $A_1$, and number of bits (m−1)b of the number $A_1$ (steps S162a, S163).

Next, the CPU 102 uses the number $A_2$ extracted in step S161 as the index I to read the element data G[$A_2$] from the pre-calculated table G in the volatile memory 106. Then, the CPU 102 calculates logically masked lower data $x'_2$ to a value of $x'_2=(G[A_2]\char`\^ R_2)\char`\^ r$ (steps S164, S165).

The CPU 102 arranges the logically masked lower data $x'_2$ in such a way that the least significant bit of the logically masked lower data $x'_2$ is aligned with the lower (k−m)b-th bit of the logically masked data x' in the volatile memory 106 (step S166).

After the arrangement, the CPU 102 updates the integer m in the volatile memory 106 to m=m−1 before returning to the processing in step S130 (step S167).

Hereinafter, the CPU 102 performs the processing in step S130 and thereafter again.

According to the second embodiment described above, with the configuration obtained by applying the first embodiment to a conventional conversion method from an arithmetic mask to a logical mask, the size of a pre-calculated table needed when arithmetically masked data is converted into logically masked data can be reduced.

To add supplementary remarks, the second embodiment follows, like the first embodiment, the [CT2003] method and thus, the size of a pre-calculated table can be reduced while retaining resistance to side channel analyses so that a pre-calculated table can be implemented more easily in a device such as a smart card in which resources are subject to severe constraints.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

The present invention is not limited to the embodiments. The invention can be embodied by changing the constituent elements in an execution phase without departing from the spirit and scope of the invention. In addition, various inventions can be formed by appropriate combinations of the plurality of constituent elements disclosed in the embodiments. For example, several constituent elements may be deleted from all the constituent elements described in the embodiments. Furthermore, the constituent elements over the different embodiments may be appropriately combined with each other.

What is claimed is:

1. An operation unit that generates a pre-calculated table C' including ($4 \times 2^{b/2}$) pieces of b-bit element data C'[y] individually readable by ($4 \times 2^{b/2}$) indices y ($0 \leq y < 4 \times 2^{b/2}$) before processing to obtain an addition result of upper (k−1)b bits by adding a kb-bit number A composed of a number $A_1$ of upper (k−1)b bits and a number $A_2$ of lower b bits (b>4) and a number r of b bits and can propagate carrying-over from the addition result of the number $A_2$ and the number r to the number $A_1$ based on the pre-calculated table C' during the processing of the addition, comprising:

an unit that generates a random number γ of the b bits;

a storage unit to store each of the indices y and the pre-calculated table C' including each piece of element data C'[y] associated with each of the indices y;

an unit that sets first to $2^{b/2}$-th pieces of the element data C'[y] of the pre-calculated table C' in the storage unit to values $C'[y]=2^{b/2}(0 \leq y<2^{b/2}-r_H-1)$ $C'[y]=2\times 2^{b/2}(y=2^{b/2}-r_H-1)$ $C'[y]=3\times 2^{b/2}(2^{b/2}-r_H \leq y<2^{b/2})$ based on the index y and a number $r_H$ of upper b/2 bits of the number r;

the unit that sets $(2^{b/2}+1)$-th to $(2\times 2^{b/2})$-th pieces of the element data C'[y] of the pre-calculated table C' in the storage unit to the value $C'[y]=\gamma(2^{b/2} \leq y<2\times 2^{b/2})$ based on the index y and the random number γ;

the unit that sets $(2\times 2^{b/2}+1)$-th to $(3\times 2^{b/2})$-th pieces of the element data C'[y] of the pre-calculated table C' in the storage unit to the values $C'[y]=\gamma(2\times 2^{b/2} \leq y<3\times 2^{b/2}-r_L)$ $C'[y]=\gamma+1(3\times 2^{b/2}-r_L \leq y<3\times 2^{b/2})$ based on the index y, the random number γ, and the number $r_L$ of lower b/2 bits of the number r;

the unit that sets $(3\times 2^{b/2}+1)$-th to $(4\times 2^{b/2})$-th pieces of the element data C'[y] of the pre-calculated table C' in the storage unit to the value $C'[y]=\gamma+1(3\times 2^{b/2} \leq y<4\times 2^{b/2})$ based on the index y and the random number γ;

a first extraction unit that extracts the number $A_1$ and the number $A_2$ from the number A;

a second extraction unit that extracts a number $A_H$ of upper b/2 bits and a number $A_L$ of lower b/2 bits of the number $A_2$ from the number $A_2$;

a first reading unit that sets the values of the $(4\times 2^{b/2})$ pieces of the element data C'[y] and then reads first element data C'[$A_H$] from the pre-calculated table C' in the storage unit by using the extracted number $A_H$ as the index y;

a second reading unit that reads second element data C'[C'[$A_H$]+$A_L$] from the pre-calculated table C' in the storage unit by using a sum of the first element data C'[$A_H$] and the extracted number $A_L$ as the index y; and a carrying-over propagation unit that propagates carrying-over to the number $A_1$ by calculating $A_1$+C'[C'[$A_H$]+$A_L$]−γ mod $2^{(k-1)b}$ based on the second element data C'[C'[$A_H$]+$A_L$], the random number γ, the number $A_1$, and a number of bits (k−1)b of the number $A_1$.

2. The operation unit according to claim 1, further comprising:

a second storage unit (106) to store $2^b$ indices I ranging from 0 to $2^b-1$ and a second pre-calculated table G including $2^b$ pieces of element data G[I]=((I+r) mod $2^b$)^r (^ is a symbol denoting an XOR) that can individually be read by each of the indices I;

the unit that generates the second pre-calculated table G based on the index I, the random number r, and the number of bits b and writes the second pre-calculated table G into the second storage unit;

a third storage unit to store an integer m and logically masked data x';

the unit that sets the integer m and the logically masked data x' to m=k and x'=0 respectively and writes the integer m and the logically masked data x' into the third storage unit;

a unit to input an mb-bit number R composed of a number $R_1$ of upper (m−1)b bits and a number $R_2$ of lower b bits;

a subtraction unit that subtracts the random number r from the number A as arithmetically masked data under mod $2^{mb}$;

the unit that extracts, after the subtraction, the numbers $R_1$, $R_2$ from the input number R;

the unit that adds, after the extraction, the number $R_2$ to the number A under mod $2^{mb}$;

the unit that determines, after the addition, whether the integer m in the third storage unit is m=1 or not;

the unit that reads, if m=1 as a result of the determination, the element data G[A] from the pre-calculated table G in the second storage unit using the number A after the addition as the index I;

the unit that calculates logically masked upper data $x'_1$ to the value of $x'_1$=(G[A]^$R_2$)^r based on the element data G[A], the number $R_2$, and the random number r;

the unit that arranges the logically masked upper data $x'_1$ obtained by the calculation in the most significant b bits of the logically masked data x' in the third storage unit;

the unit that performs, if m>1 as a result of the determination, the processing by the first extraction unit, the second extraction unit, the first reading unit, the second reading unit, and the carrying-over propagation unit sequentially;

the unit that reads the element data G[$A_2$] from the pre-calculated table G in the second storage unit after the processing by the carrying-over propagation unit is performed using the number $A_2$ of lower b bits of the number A after the addition as the index I;

the unit that calculates logically masked upper data $x'_2$ to the value of $x'_2$=(G[$A_2$]^$R_2$)^r based on the element data G[$A_2$], the number $R_2$, and the random number r;

the unit that arranges the logically masked upper data $x'_2$ obtained by the calculation in such a way that the least significant bit of the logically masked lower data $x'_2$ is aligned with the lower (k−m)b-th bit of the logically masked data x' in the third storage unit; and the unit that updates, after the arrangement, the integer m in the third storage unit to m=m−1 before returning to the processing of the subtraction unit.

3. A program stored in a non-transitory computer readable storage medium and used in an operation unit that generates a pre-calculated table C' including $(4\times 2^{b/2})$ pieces of b-bit element data C'[y] individually readable by $(4\times 2^{b/2})$ indices y $(0 \leq y<4\times 2^{b/2})$ before processing to obtain an addition result of upper (k−1)b bits by adding a kb-bit number A composed of a number $A_1$ of upper (k−1)b bits and a number $A_2$ of lower b bits (b>4) and a number r of b bits and can propagate carrying-over from the addition result of the number $A_2$ and the number r to the number $A_1$ based on the pre-calculated table C' during the processing of the addition, comprising:

a first program code causing the operation unit to perform processing to generate a random number γ of the b bits;

a second program code causing the operation unit to perform the processing to write each of the indices y and the pre-calculated table C' including each piece of element data C'[y] associated with each of the indices y into a storage unit of the operation unit;

a third program code causing the operation unit to perform the processing to set first to $2^{b/2}$-th pieces of the element data C'[y] of the pre-calculated table C' in the storage unit to values $$C'[y]=2^{b/2}(0\leq y<2^{b/2}-r^H-1)$$

$$C'[y]=2\times 2^{b/2}(y=2^{b/2}-r_H1)$$

$$C'[y]=3\times 2^{b/2}(2^{b/2}-r_H\leq y<2^{b/2})$$

based on the index y and a number $r_H$ of upper b/2 bits of the number r;

a fourth program code causing the operation unit to perform the processing to set $(2^{b/2}+1)$-th to $(2\times 2^{b/2})$-th pieces of the element data C'[y] of the pre-calculated table C' in the storage unit to the value $$C'[y]=\gamma(2^{b/2}\leq y<2\times 2^{b/2})$$

based on the index y and the random number $\gamma$;

a fifth program code causing the operation unit to perform the processing to set $(2\times 2^{b/2}+1)$-th to $(3\times 2^{b/2})$-th pieces of the element data C'[y] of the pre-calculated table C' in the storage unit to the values $$C'[y]=\gamma(2\times 2^{b/2}\leq y<3\times 2^{b/2}-r_L)$$

$$C'[y]=\gamma+1(3\times 2^{b/2}-r_H\leq y<3\times 2^{b/2})$$

based on the index y, the random number $\gamma$, and the number $r_L$ of lower b/2 bits of the number r;

a sixth program code causing the operation unit to perform the processing to set $(3\times 2^{b/2}+1)$-th to $(4\times 2^{b/2})$-th pieces of the element data C'[y] of the pre-calculated table C' in the storage unit to the value $$C'[y]=\gamma+1(3\times 2^{b/2}\leq y<4\times 2^{b/2})$$

based on the index y and the random number $\gamma$;

a seventh program code causing the operation unit to perform first extraction processing to extract the number $A_1$ and the number $A_2$ from the number A;

an eighth program code causing the operation unit to perform second extraction processing to extract a number $A_H$ of upper b/2 bits and a number $A_L$ of lower b/2 bits of the number $A_2$ from the number $A_2$;

a ninth program code causing the operation unit to perform first reading processing to set the values of the $(4\times 2^{b/2})$ pieces of the element data C'[y] and then to read first element data C'[$A_H$] from the pre-calculated table C' in the storage unit by using the extracted number $A_H$ as the index y;

a tenth program code causing the operation unit to perform second reading processing to read second element data C'[C'[$A_H$]+$A_L$] from the pre-calculated table C' in the storage unit by using a sum of the first element data C'[$A_H$] and the extracted number $A_L$ as the index y; and an eleventh program code causing the operation unit to perform carrying-over propagation processing to propagate carrying-over to the number $A_1$ by calculating $A_1$+C'[C'[$A_H$]+$A_L$]−$\gamma$ mod $2^{(k-1)b}$ based on the second element data C'[C'[$A_H$]+$A_L$], the random number $\gamma$, the number $A_1$, and a number of bits (k−1)b of the number $A_1$.

4. The program according to claim 3, further comprising:

a twelfth program code causing the operation unit to perform the processing to generate $2^b$ indices I ranging from 0 to $2^b-1$ and a second pre-calculated table G (106) including $2^b$ pieces of element data G[I]=((I+r) mod $2^b$)^r (^ is a symbol denoting an XOR) that can individually be read by each of the indices I based on the index I, the random number r, and the number of bits b and to write the generated second pre-calculated table G into a second storage unit of the operation unit;

a thirteenth program code causing the operation unit to perform the processing to set the integer m and the logically masked data x' to m=k and x'=0 respectively and to write the integer m and the logically masked data x' into a third storage unit of the operation unit;

a fourteenth program code causing the operation unit to perform the processing to input an mb-bit number R composed of a number $R_1$ of upper (m−1)b bits and a number $R_2$ of lower b bits;

a fifteenth program code causing the operation unit to perform subtraction processing to subtract the random number r from the number A as arithmetically masked data under mod $2^{mb}$;

a sixteenth program code causing the operation unit to perform the processing to extract, after the subtraction, the numbers $R_1$, $R_2$ from the input number R;

a seventeenth program code causing the operation unit to perform the processing to add, after the extraction, the number $R_2$ to the number A under mod $2^{mb}$;

an eighteenth program code causing the operation unit to perform the processing to determine, after the addition, whether the integer m in the third storage unit is m=1 or not;

a nineteenth program code causing the operation unit to perform the processing to read, if m=1 as a result of the determination, the element data G[A] from the pre-calculated table G in the second storage unit using the number A after the addition as the index I;

a twentieth program code causing the operation unit to perform the processing to calculate logically masked upper data $x'_1$ to the value of $x'_1=(G[A]\string^R_2)\string^r$ based on the element data G[A], the number $R_2$, and the random number r;

a twenty-first program code causing the operation unit to perform the processing to arrange the logically masked upper data $x'_1$ obtained by the calculation in the most significant b bits of the logically masked data x' in the third storage unit;

a twenty-second program code causing the operation unit to perform, if m>1 as a result of the determination, the processing of the first extraction processing, the second extraction processing, the first reading processing, the second reading processing, and the carrying-over propagation processing sequentially;

a twenty-third program code causing the operation unit to perform the processing to read the element data G[$A_2$] from the pre-calculated table G in the second storage unit after the carrying-over propagation processing is performed using the number $A_2$ of lower b bits of the number A after the addition as the index I;

a twenty-fourth program code causing the operation unit to perform the processing to calculate logically masked lower data $x'_2$ to the value of $x'_2=(G[A_2]\string^R_2)\string^r$ based on the element data G[$A_2$], the number $R_2$, and the random number r;

a twenty-fifth program code causing the operation unit to perform the processing to arrange the logically masked lower data $x'_2$ obtained by the calculation in such a way that the least significant bit of the logically masked lower data $x'_2$ is aligned with the lower (k−m)b-th bit of the logically masked data x' in the third storage unit; and a twenty-sixth program code causing the operation unit to perform the processing to update, after the arrangement, the integer m in the third storage unit to m=m−1 before returning to the processing of the subtraction processing.

* * * * *